(12) United States Patent
Rudolph et al.

(10) Patent No.: US 8,582,156 B2
(45) Date of Patent: Nov. 12, 2013

(54) PRINTING SYSTEM CONTROL USING MULTIPLE METADATA PACKETS

(75) Inventors: Paul Rudolph, Dayton, OH (US);
Russell L. Bartley, Urbana, OH (US);
Michael J. Piatt, Dayton, OH (US);
Ronald J. Duke, Centerville, OH (US)

(73) Assignee: Eastman Kodak Company, Rochester, NY (US)

( * ) Notice: Subject to any disclaimer, the term of this patent is extended or adjusted under 35 U.S.C. 154(b) by 339 days.

(21) Appl. No.: 12/862,059

(22) Filed: Aug. 24, 2010

(65) Prior Publication Data

US 2012/0050785 A1    Mar. 1, 2012

(51) Int. Cl.
*G06F 3/12* (2006.01)
*H04N 5/235* (2006.01)
*B41F 5/04* (2006.01)
*G06F 15/16* (2006.01)

(52) U.S. Cl.
USPC ........ 358/1.15; 348/222.1; 101/219; 709/219

(58) Field of Classification Search
USPC ........ 358/1.15; 101/219; 709/219; 348/222.1
See application file for complete search history.

(56) References Cited

U.S. PATENT DOCUMENTS

| | | | |
|---|---|---|---|
| 7,254,931 B2 | 8/2007 | Stemmie et al. | |
| 2002/0080389 A1 | 6/2002 | Carney et al. | |
| 2007/0086038 A1 | 4/2007 | Matsuzaki et al. | |
| 2007/0276928 A1* | 11/2007 | Rhoads et al. | 709/219 |
| 2009/0002767 A1 | 1/2009 | Ozaki et al. | |
| 2009/0231616 A1 | 9/2009 | Weber et al. | |
| 2010/0134827 A1 | 6/2010 | Weber et al. | |
| 2010/0206192 A1* | 8/2010 | Rancourt et al. | 101/219 |
| 2010/0259633 A1* | 10/2010 | Kii | 348/222.1 |

OTHER PUBLICATIONS

Anonymous: "JDF Specification Rel. 1.2", Internet Citation, May 9, 2004, URL: http://www.cip4.org/documents/jdf_specifcations/JDF1.2.pdf.

* cited by examiner

*Primary Examiner* — Miya J Cato
*Assistant Examiner* — Temitayo Folayan
(74) *Attorney, Agent, or Firm* — William R. Zimmerli; Kevin E. Spalding

(57) ABSTRACT

A method of controlling a digital printing system that uses multiple metadata packets is provided. A controller including a metadata channel is provided. Information in a first metadata packet that is associated with an initial point of interest of a media is provided by a primary metadata packet creation unit. The first metadata packet is inserted into the metadata channel of the controller. A second metadata packet including new information associated with a new point of interest of the media is created using a secondary metadata creation unit. The second metadata packet with the new formation is inserted into the metadata channel of the controller based on the location of the new point of interest of the media.

12 Claims, 12 Drawing Sheets

PRINTING SYSTEM CONTROL USING MULTIPLE METADATA PACKETS

CROSS REFERENCE TO RELATED APPLICATIONS

Reference is made to commonly-assigned, U.S. patent application Ser. No. 12/862,069, entitled "PRINTING SYSTEM CONTROL USING UPDATED METADATA PACKETS" filed concurrently herewith.

FIELD OF THE INVENTION

This invention relates generally to the field of digitally controlled printing systems, and in particular to controlling the functionality of these printing systems.

BACKGROUND OF THE INVENTION

Using metadata, sometimes referred to as data about data, to control digital printing systems is known. Conventional techniques for using metadata typically include indirectly sending the metadata from a single source to a component of the digital printing system that uses the information. In order for a system component to be able to use the data contained in the metadata, the data is printed by a first component of the digital printing system then read by a second component of the digital printing system prior to being used by the intended component of the digital printing system. In this sense, the data is indirectly sent to the designated system component. For example, in one conventional printing system, control data is printed in unused regions of a material web. These unused web regions are removed after the control data is read by another component of the printing system.

The functionality of these printing systems, while improved when compared to printing systems that do not use metadata, is limited. The control of these printing systems, while improved when compared to printing systems that do not use metadata, is limited. This is because the data comes from a single source and needs to be read by another system component prior to being used by the intended system component. Increased material waste can result when the portion of the material web that includes the printed data is removed. Alternatively, when the data is left on the material web, the resulting documents can be lees aesthetically pleasing when compared to documents in which the data has been removed.

Accordingly, there is an ongoing need for enhanced functionality and control of digital printing systems. There is an ongoing need to reduce waste or improve the aesthetic appearance of documents printed by these printing systems that use metadata to increase functionality or control.

SUMMARY OF THE INVENTION

According to one aspect of the present invention, a method of controlling a digital printing system includes using multiple metadata packets. A controller including a metadata channel is provided. Information in a first metadata packet that is associated with an initial point of interest of a media is provided by a primary metadata packet creation unit. The first metadata packet is inserted into the metadata channel of the controller. A second metadata packet including new information associated with a new point of interest of the media is created using a secondary metadata creation unit. The second metadata packet with the new formation is inserted into the metadata channel of the controller based on the location of the new point of interest of the media.

The present invention helps to directly increase the functionality of digital printing systems and helps to precisely control digital printing systems. Functionality is directly increased by the present invention because metadata from one or more sources is sent directly to the component of the printing system that uses the information. The metadata is linked to a specific media location which allows for precise control of when the information is used by the component of the printing system. Additionally, tracking and verification of the printing process are enhanced as a result of more than one source creating or adding to the metadata.

DETAILED DESCRIPTION OF THE INVENTION

Figure 1:
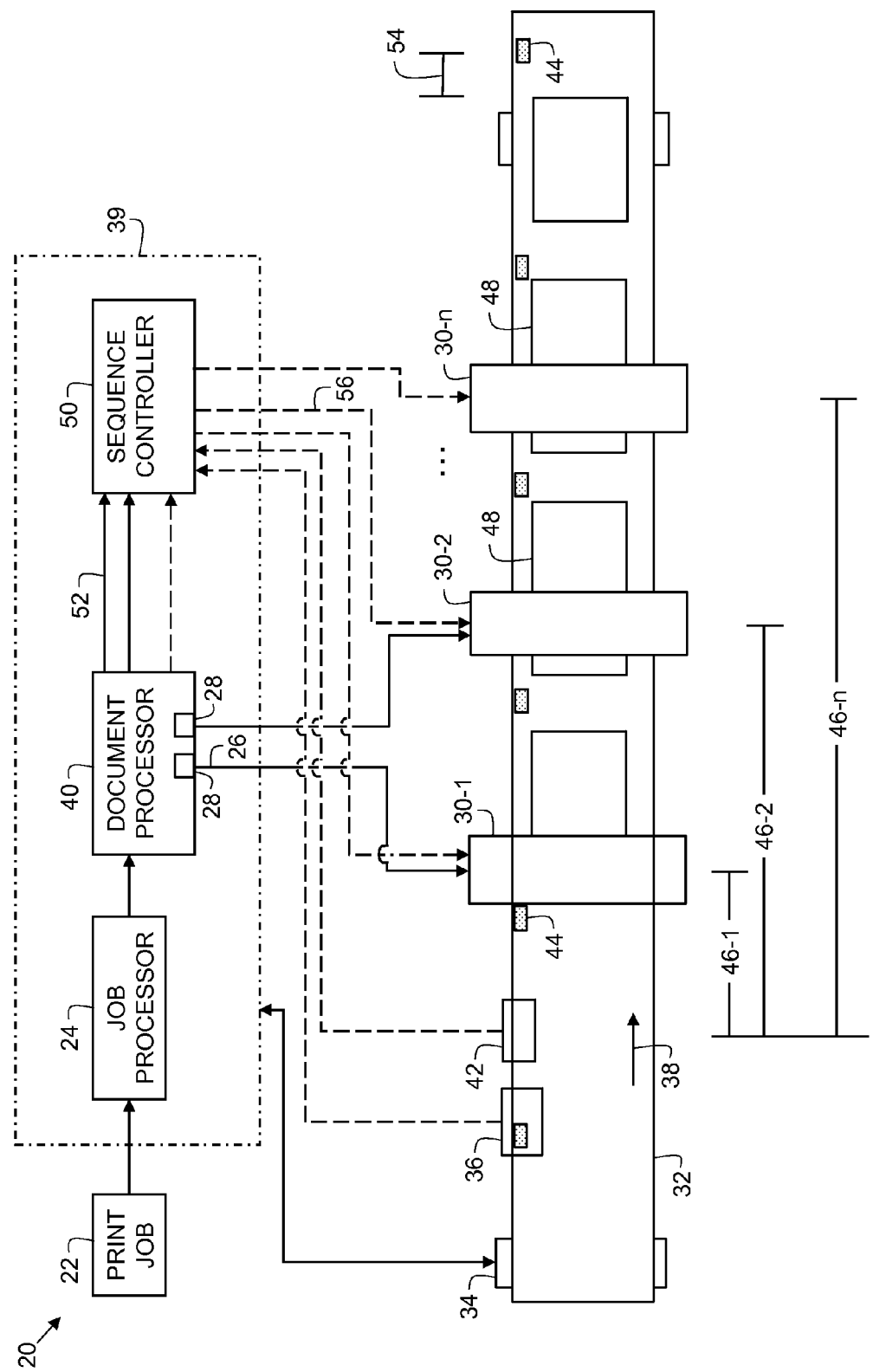
FIG. 1 illustrates a digital printing system incorporating the present invention.

The present description will be directed in particular to elements forming part of, or cooperating more directly with, apparatus in accordance with the present invention. It is to be understood that elements not specifically shown or described may take various forms well known to those skilled in the art. In the following description and drawings, identical reference numerals have been used, where possible, to designate identical elements.

The example embodiments of the present invention are illustrated schematically and not to scale for the sake of clarity. One of the ordinary skills in the art will be able to readily determine the specific size and interconnections of the elements of the example embodiments of the present invention.

As described herein, the example embodiments of the present invention provide one or more printheads for printing on a recoding media. The one or more printheads may include inkjet printheads, which create drops of ink that are deposited on the recording media, electrophotographic printheads, or other printheads based on other marking technologies.

Referring to FIG. 1, a printing system 20 includes a plurality of operating units 30 for printing and carrying out other functions on the media 32 as the media is moved through the printing system. The printing system can accept print jobs 22 from one or more sources. The job processor 24 receives the print jobs and can extract information used to control processing of the job. The extracted information can include the number of documents, page length, print margins, paper type, fixed content files, database information, variable content files into which database information is inserted, document component selection rules based on database information, color processing profiles, and document finishing (cutting, folding, sorting, etc.) information. The job processor can use the extracted information to configure the various operating unit to process the print job. The extracted information can also be used to confirm that the proper paper is loaded for the print job, the desired inks are in place, and that the printing system includes the operating units needed to complete the job.

The documents contained in the print job are transferred to a document processor. The document is converted to bitmap image data by a document processor 40 which also stores the image data in memory. In a printing system having a plurality of printheads, the document processor can include a plurality of raster image processors 28, working in parallel to bit map the document data. The bitmapped image data 26 from the document processor 40 is directed to the one or more printheads 30.

Recording media 32 is moved relative to operating units 30, such as printheads, as indicated by arrow 38, by a recording media transport system 34, which is electronically controlled by the machine controller 39. The machine controller 39 can include the job processor 24, the document processor 40, and a sequence controller 50, as suggested in FIG. 1 or alternatively they can be separate components of the printing system. The recording media transport system shown in FIG. 1 is a schematic only, and many different mechanical configurations are possible. For example, a transfer roller could be used as recording media transport system 34 to facilitate transfer of the ink drops from an inkjet printhead to recording media 32. Such transfer roller technology is well known in the art.

When multiple operating units 30 such as printheads are to act on the media 32 as it passes by them in the printing system, it is necessary to control the timing or sequence of operations of each of the operating units so that their actions are properly registered on the media 32. For example when the operating units include printheads for multiple ink colors, it is necessary to properly register the print of each of the printheads. Similarly when printing on a pre-printed recording media 32, it is necessary to align a document image 48 being printed with the pre-printed image. The sequence controller 50 is responsible for controlling the registration of actions by each of the operating units.

An encoder 36 is used to track the motion of the media 32 as it moves through the printing system. Typically the encoder 36 creates electrical pulses at a defined number of pulses per unit length, PL, of the media 32 moved past the encoder. Typically the encoders are rotary encoders that are coupled to a wheel that contacts the media or to a roller over which the media passes, such that motion of the media causes the rotary encoder to rotate. Alternatively, other encoders including non-contact optical encoders can be used. A cue sensor 42 can be used to detect a cue mark 44 or other feature from pre-printed recording media 32. Typically the position of the cue sensor 42 along the media path serves as an origin, or zero position, along the media path. On media which hasn't been pre-printed, there are no cue marks to serve as a reference for the start of a document. A virtual cue is then created. In such cases, a virtual cue is created as the reference for the start of a document. The virtual cue is based on the known length of each document measured out by the encoder. In the absence of a physical cue sensor; the encoder, one of the operating units, or any other point along the media path can serve as the origin for the media path. The position of each of the operating units 30-1 through 30-$n$ along the media path is defined relative to the origin position. Operating unit 30-1 located downstream of the cue sensor by a delay distance 46-1. Similarly a delay distance 46-$i$ can be determined for each of the other operating units 30-2 through 30-$n$. From the delay distances 46-$i$, a delay count $D_i$ is defined for each operating unit i by $D_i$ equals delay distance 46-$i$ times the pulses per unit length PL from the encoder. The distance 46-$i$ and the delay count $D_i$ of an operating unit are positive if the unit is located downstream of the media path origin, and are negative if the unit is upstream of the origin.

As indicated in FIG. 1, the signals from the encoder and cue sensor are supplied to a sequence controller 50. It uses these signals along with information related to the delay count for each printhead or other operating units to create the control signals needed to properly register the actions of each of the operating units on the printing system.

Exemplary operating units 30 can include print stations or printheads, specialty printing units such as for printing metallic patterns or MICR, embossers, paper splicers, cutters, folders, slitters, sorters, media coating units, dryers and curing units, and other equipment that can act selectively on the media as it passes the unit. Exemplary units can also include inspection equipment, verifying equipment, as well as other equipment that can monitor or make measurements related to the media or images printed on the media as the recording media passes the equipment. Inspection equipment can include optical densitometers for measuring the optical density of print on the recording media, spectrophotometers for measuring the color of print, sensors for ensuring proper image plane registration (such as color to color registration, printhead stitching sensors, and the registration of the images on the front and back side of the media), and print quality sensors such as detectors for missing jets or streakers. Verifying equipment can include, but is not limited to, equipment that confirms that the data printed on a document matches the intended data, tests for the proper correlation of image planes printed by the various printheads, and readability sensors of, for example, printed UCR text, bar codes, or MICR print. Each of these units is located at some position along the media path as the recording media move from the media source to the media output.

The invention enhances the operation of the printing system through the use of a metadata channel used for communicating with operating units along the media path of the printing system. The metadata channel contains packets of information; these packets contain data related to the operation of one or more of the operating units. Each metadata packet contains an index that links the packet directly with a specific position or point of interest along the media. As the media passes through the digital printing system, the point of interest moves with the media. As the point of interest on the media passes each of the operating units, the data in the linked metadata packet can be employed to control or modify the action of the operating unit. The metadata packet can also receive data from the operating unit that is then linked to the point of interest on the media.

Figure 2:
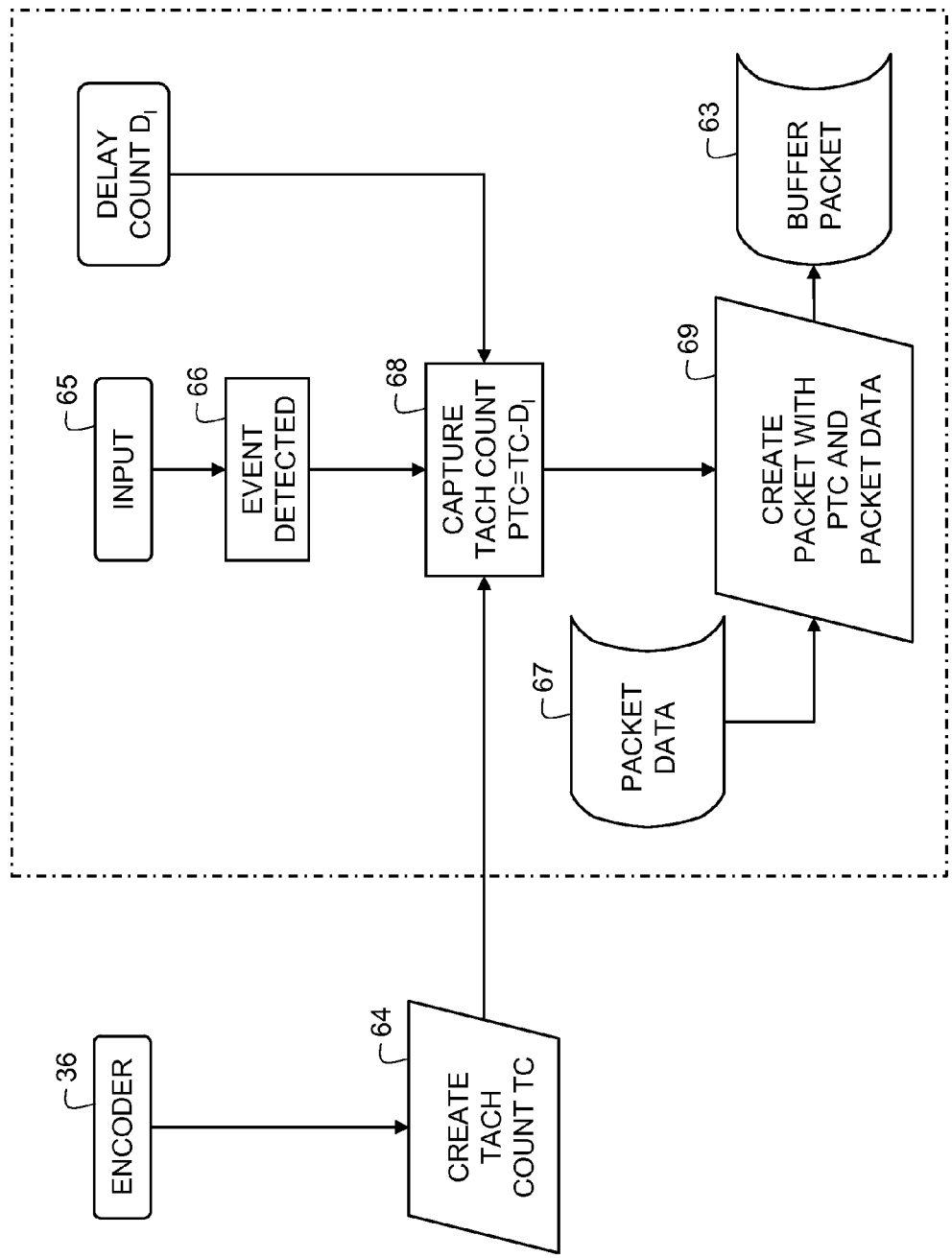
FIG. 2 is a functional block diagram depicting the creation of a metadata packet linked to a point of interest on the print media.

To understand the enhanced functionality, the steps of writing to and reading from the metadata packets should be understood. FIG. 2 illustrates the creation of metadata packets in response to an event associated with a point of interest on the media moving past a specific location along the media path, such as past operating unit 30-$i$. As the media passes through the printing system, an encoder 36 tracks the media motion. The encoder 36 creates electrical pulses at a defined number of pulses per unit length, PL, of the media 32 moved past the encoder. A counter 64 counts the pulses created by the encoder 36 to create a tach count value TC.

A cue sensor 42 signal or some other signal typically associated with operating unit 30-$i$ serves as an input 65 to an event detector 66. When an event is detected as a point of interest on the media is moving past the operating unit 30-$i$, the current tach count TC is captured 68. The delay count $D_j$ is subtracted from the captured tach count TC to create a packet tach count PTC. If the operating unit 30-$i$ is located at the origin position, $D_i$ is zero. PTC is then equal to the tach count at the instant the point of interest on the media is moving past origin position. If the operating unit 30-$i$ is located at some other position along the media path than the origin, then the delay count $D_i$ is not equal to zero. The created packet tach count PTC then doesn't correspond to the tach count at the time the event is detected as a point of interest on the media is moved past the operating unit 30-$i$. PTC rather corresponds to the tach count at the instant that point of interest passes the origin. A metadata packet is created 69 that includes PTC as the primary index along with other packet data 67. The other packet data 67 may originate in the operating unit 30-$i$, or be supplied by the job processor 24, the page processor 25, the machine controller 39, or some other source. The metadata packets are placed in a buffer 63, called a metadata channel, to be accessed by other operating units in the printing system. Tagging each metadata packet with a PTC value in this manner, associates the metadata packet with a particular point of interest; the point of interest being the specific point on the media that passed the origin position when the tach count TC equaled the PTC value. In this manner, the initially provided information in the metadata packet is associated with the point of interest of the media as a result of assigning to the metadata packet an index number related to the location of the point of interest.

In many digital printing systems, metadata packets will be created and inserted into the metadata channel by a primary packet creation unit at a single location along the media path. The metadata packets created by this unit typically each link or associate a print document with a point if interest. The packets can include a document reference number. As the printhead operating units retrieve the bitmapped documents from the print data buffers, the retrieved document data can include a document reference number which is checked against the document reference number stored in the metadata packet. Additionally all metadata related to the document are placed in the packet linked to this point of interest. The document metadata can include data from the job processor and the pager processors. This data can include the document page length, print margins, paper type, color processing profiles, and document finishing (cutting, folding, sorting, etc.) information. As will be discussed later the packet associated with a document can then be amended to include data related to the document generated by subsequent operating units in the printing system.

The location of the point of interest of the media can be monitored as the media moves through the digital printing system along a media path. This can include determining when the point of interest arrives at a location along the media path. Alternatively, monitoring the point of interest can detect at a location along the media path a mark on the recording media indicating the location of the point of interest. After the point of interest has been located by the system, information or data from the metadata packet is read for use at that location.

Figure 3:
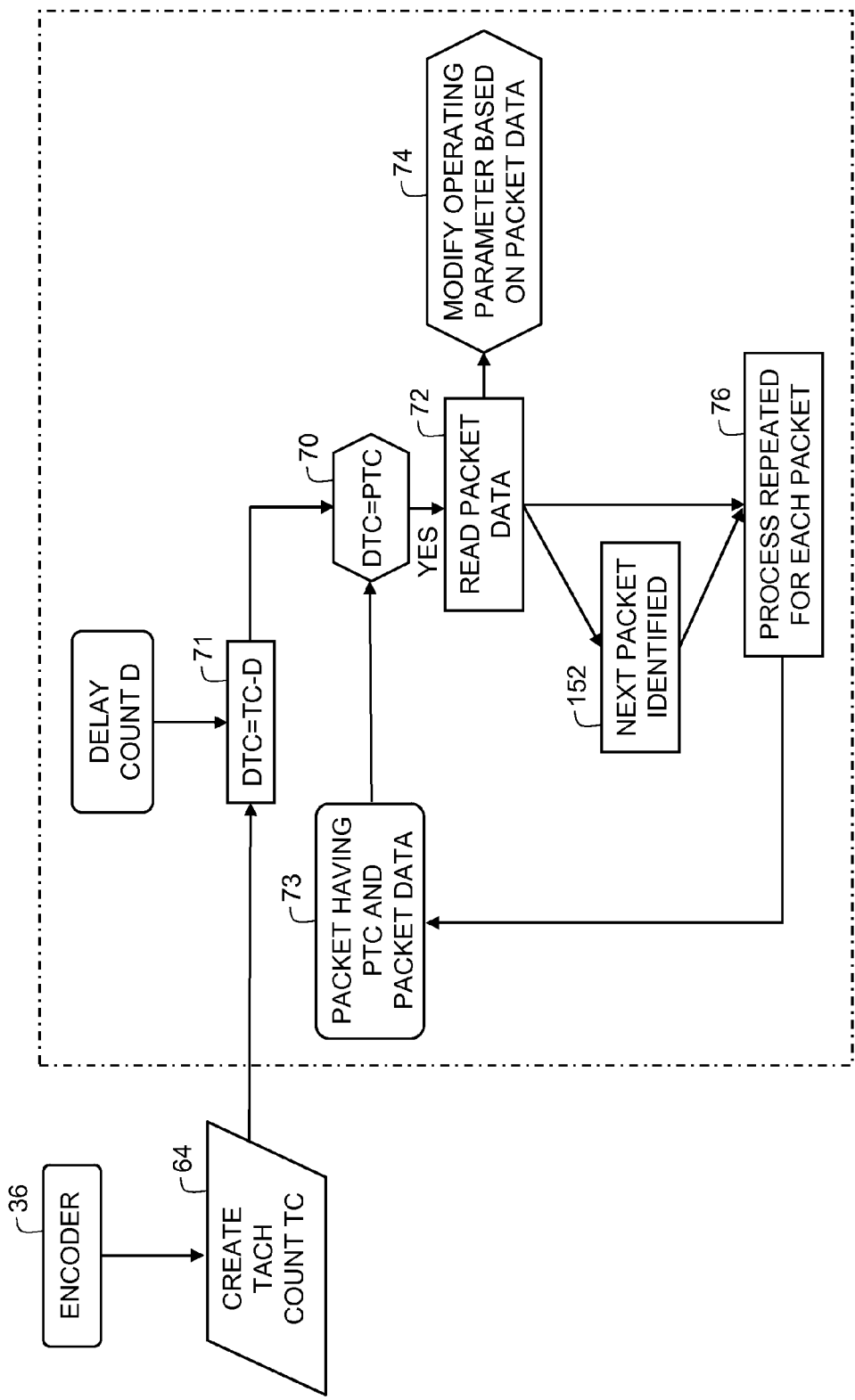
FIG. 3 is a functional block diagram illustrating the reading of data from a metadata packet when the point of interest on the media linked with the metadata packet has arrived at a specific location along the media path.

The reading of the metadata packets for use by an operating unit along the media path is illustrated in FIG. 3. The tach count TC is received from the counter 64 that counts the pulses from the encoder 36. Typically one encoder 36 and counter 64 supply the tach count to all operating units 30. The operating unit 30-$i$ has an associated delay count $D_i$, corresponding to its location along the media path. A count shifter 71 shifts the tach count TC is shifted by subtracting $D_i$ from the stream of TC values received from the counter to create a stream of device tach count, DTC, values. The location of the point of interest of the media is monitored by comparing the PTC value stored in each of the metadata packets with the current value of DTC in a comparator 70. Alternatively, instead of subtracting the delay count $D_l$ from the tach count TC for comparison with the packet PTC values, the delay count $D_l$ could be added to the PTC value in a packet for comparison with the tach count TC. If the values match for a metadata packet indicated the point of interest has arrived at a specific location along the media path, the packet data is read 72. The data from the packet can be employed by the unit initiate or terminate an operation by the unit or otherwise modify an operating parameter 74 of the operating unit. This process is repeated 76 for every metadata packet. The various packets may or may not contain data that is relevant to a particular operating unit. If a packet doesn't have data relevant to the unit, the packet data is ignored by the operating unit.

As described above, each packet is created with a value for PTC, which corresponds to the tach count at the instant a particular point A on the media reaches the origin, which is typically at the packet creating unit, of the printing system. Each packet can then be read by operating units that are downstream of the writing unit when the PTC value stored in the packet equals the DTC value at reading operating unit. This occurs when the point of interest on the media identified by the PTC value reaches the location along the media path of the operating unit. The result is that the metadata packet is linked to a point of interest along the media, and effectively moves with the media to be read by each operating unit as it moves past that operating unit in the printing system. In this manner, the location of the point of interest can be monitored by counting pulses from the encoder using a counter and then comparing the pulse count to the index number stored in the metadata packet.

Generally described, one aspect of the present invention provides a method of controlling a digital printing system that updates information provided to a metadata packet. Information is provided in a metadata packet that is associated with a point of interest of a media. The location of the point of interest of the media is monitored as the media moves through the digital printing system along a media path. An operating parameter of the digital printing system is monitored. The initially provided information in the metadata packet that is associated with the point of interest is modified based on the monitored operating parameter of the digital printing system and the monitored location of the point of interest of the media. An example embodiment of this aspect of the present invention is described below.

Figure 4:
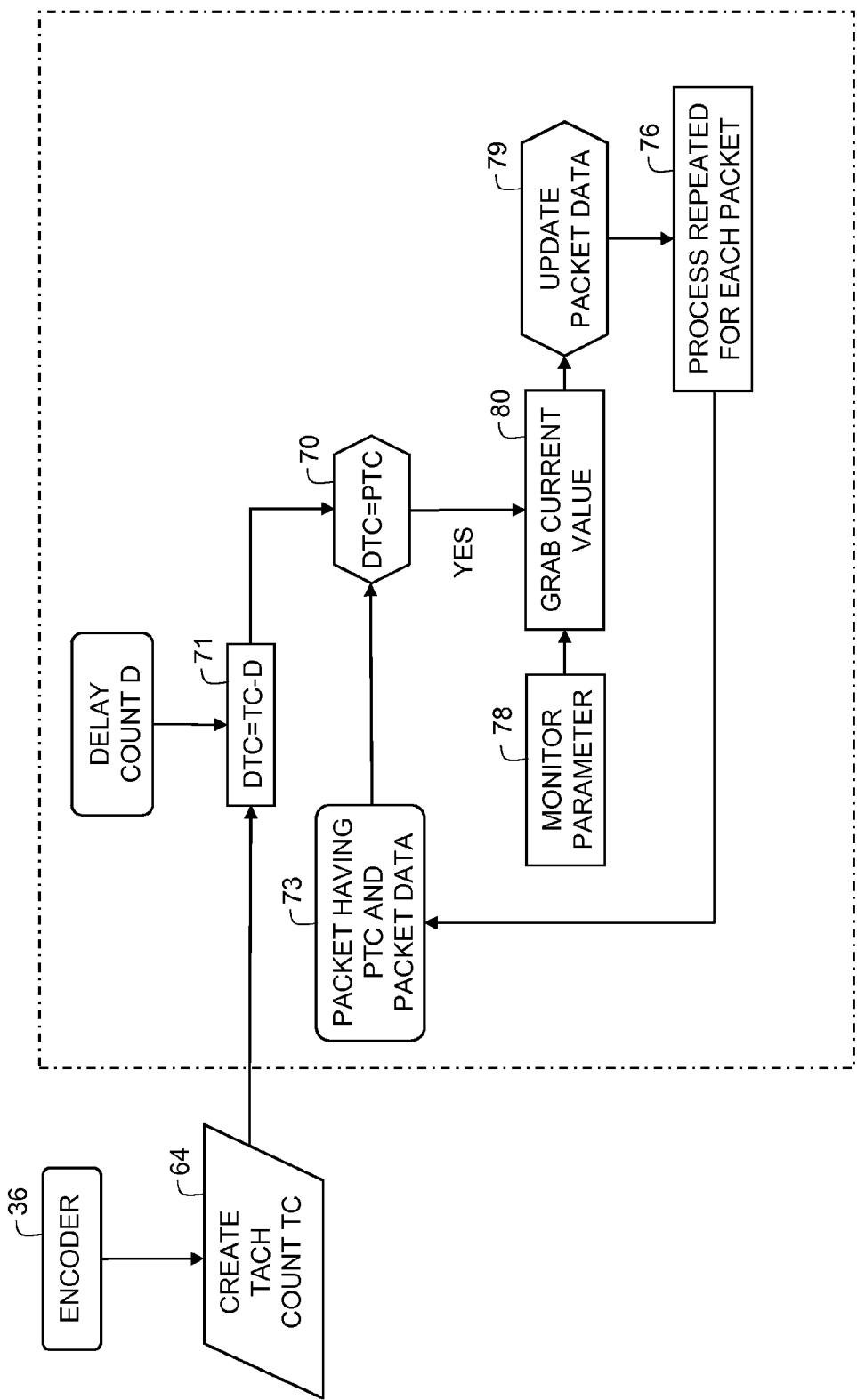
FIG. 4 is a functional diagram that illustrates updating a metadata packet with data from a monitored parameter when the point of interest on the media linked with the metadata packet has arrived at a specific location along the media path.

The enhanced sequence controller 50 enables the operating units to interact with the metadata packets in other ways in addition to the functions of creating packets and reading packets discussed above. The units can also append data to or replace data in existing metadata packets. An example of this is shown in FIG. 4. In this example some operating parameter of the printing operation is being monitored 78. The parameter may be an operating parameter of the unit, an environmental parameter, or a measurement related to the media as it moves past the operating unit. When the comparator 70 determines that the device tach count DTC matches the PTC value of a metadata packet 73 (the monitored location of the particular point of interest of the media associated with the metadata packet arrives at the operating unit, the current value of the monitored parameter is captured 80 and the metadata packet is updated 79 with the captured data. In some cases, the inserted parameter data may replace existing data in the metadata packet, while in other cases; the data may be appended as an additional parameter to the existing data in the metadata packet. This process is repeated 76 for every metadata packet.

At least one operating parameter of the digital printing system is monitored. Data is read from the metadata packet associated with a point of interest of the media. This data is used to modify an operation of the digital printing system. The modification of the operation can affect the monitored operating parameter. The data that results from the modification of the operation of the digital printing system is captured. This resulting data can be written to the metadata packet. Alternatively, a second metatdata packet can be created by a secondary metadata creation unit that includes new information associated with a new point of interest of the media. This example embodiment is discussed in more detail below. This data can also result from the monitored operating parameter of the digital printing system.

Modifying the operation of the digital printing system using the read data can include defining a region of the recording media to be acted on by an operating unit of the digital printing system. When this happens, capturing the data that results from modifying the operation of the digital printing system can include measuring a parameter related to the recording media within the defined region. Alternatively, monitoring the operating parameter of the digital printing system can include monitoring a parameter related to one of the recording media and print on the recording media.

Figure 5:
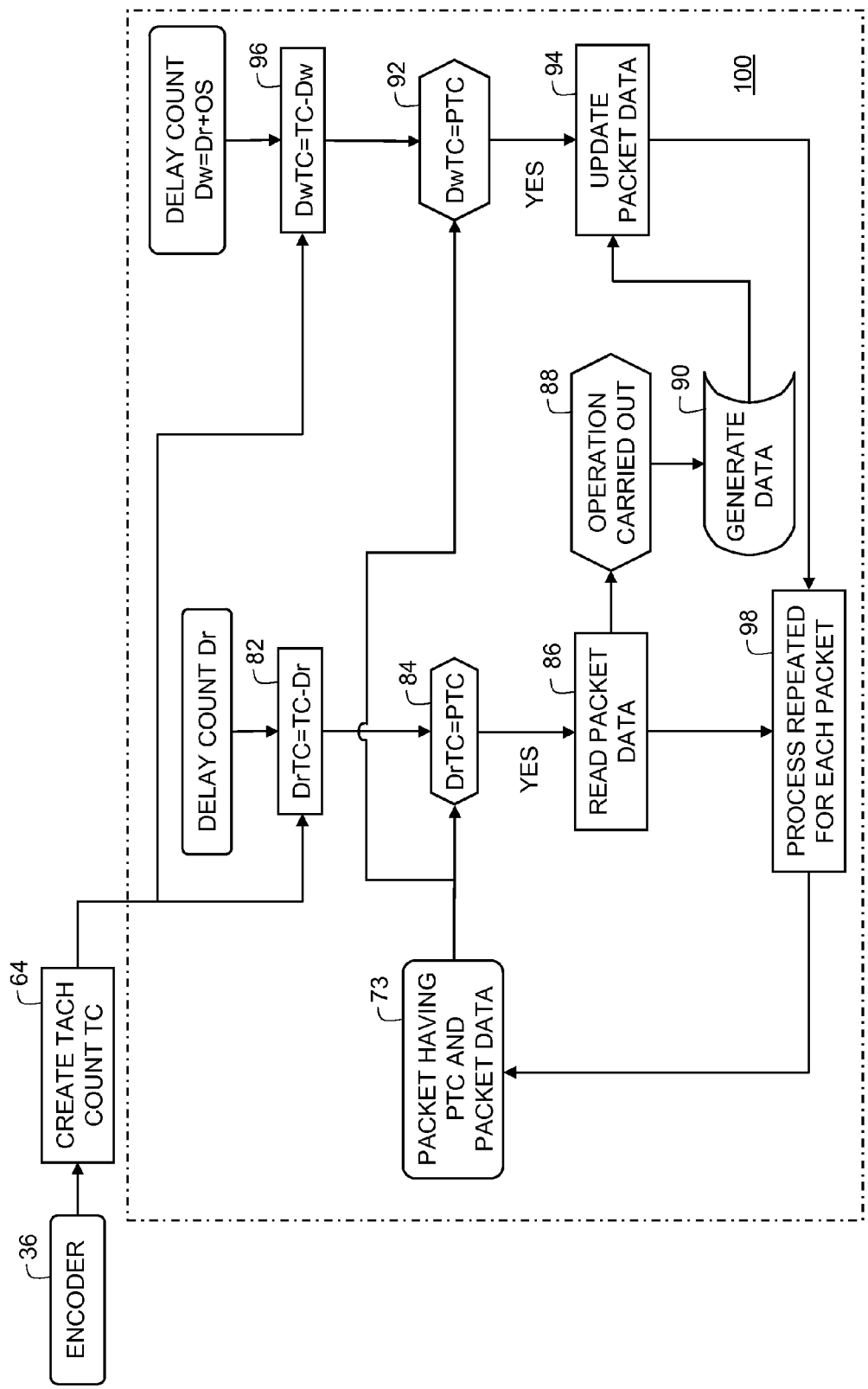
FIG. 5 is a functional diagram that illustrates carrying out an operation based on the data from a metadata packet and updating the metadata packet with response data from the operation when the point of interest on the media linked with the metadata packet has arrived at a specific location along the media path.

For example, some operating units may need to read information from a packet of information before generating data that is to be inserted into the metadata packet. In this mode of operation, the metadata packet contains information that relates to some function or operation of the unit. The unit then generates some data as a result of the function or operation. This data is then inserted into the metadata packet. For example, a bar code verifier could obtain data from the metadata packet to indicate the location of a bar code on a document. The metadata packet might also include the bar code type, and the desired value of the bar code. Using the data from the packet, the verifier could examine the specified location on the print media for the bar code. The bar code verifier could confirm that the printed bar code was of the desired type, and could verify that the read bar code value matched the desired value obtained from the metadata packet. The results of the verification are inserted into the metadata packet. FIG. 5 illustrates an embodiment of this type of interaction with a metadata packet. As the operating unit requires some time to carry out its operation based on the packet data, the operating unit doesn't simultaneously read the packet data and write the response data to the packet. To accommodate the time required to acquire the response data, the illustrated embodiment separates the reading and writing operations so that they occur at different delay count values (effectively at two different locations along the media path) even though both the reading and writing operations are associated with a single operating unit. The reading operation has a reading delay count Dr, which is subtracted from the current tach count TC to form the reading device tach count DrTC in count shifter 82. As the media passes through the printing system, the tach count TC and the device read tach counts DrTC values increase with each encoder pulse. When the comparator 84 determines that a packet PTC equals the current DrTC value, the packet is read 86. The operating unit may then employ data from the packet to carry out some function or operation 88. As a result of carrying out the function or operation, some data is created 90 by the unit. The response data is captured, for example, in a buffer, not shown, until the packet PTC value matches the writing device tach count DwTC in comparator 92. The packet data is then updated 94 with the data from the operating unit. This (modifying the information the first metadata packet) can be accomplished using the secondary metadata creation unit described in more detail below.

The writing device tach count DwTC was formed in count shifter 96 by subtracting the write delay count Dw from the current tach count TC. The writing delay count Dw differs from the read delay count Dr by an offset OS. The offset OS value is selected to provide sufficient time for the operating unit to complete its operation and to generate the response data between the steps of reading the packet information and writing the response data to the packet. The reading and writing operations are repeated 98 for each metadata packet.

The data that is written into the metadata packets by the various operating units can be accessed by all the downstream operating units. In this manner the data generated in one operating unit can be employed by downstream units. For example if one of the operating units detected that a document was defected, an error code could be inserted into the metadata packet associated with the document. A downstream shorting unit could, upon reading the error code in the metadata packet, divert the document to a reject bin. As the operating units can insert data into the metadata packets, the metadata packet can act as a repository for data, such as validation data, from the operating units. For example, the initially provided information in the metadata packet can be modified by appending data into the metadata packet that verifies that an action of an operating unit on the recording media occurred.

Figure 6:
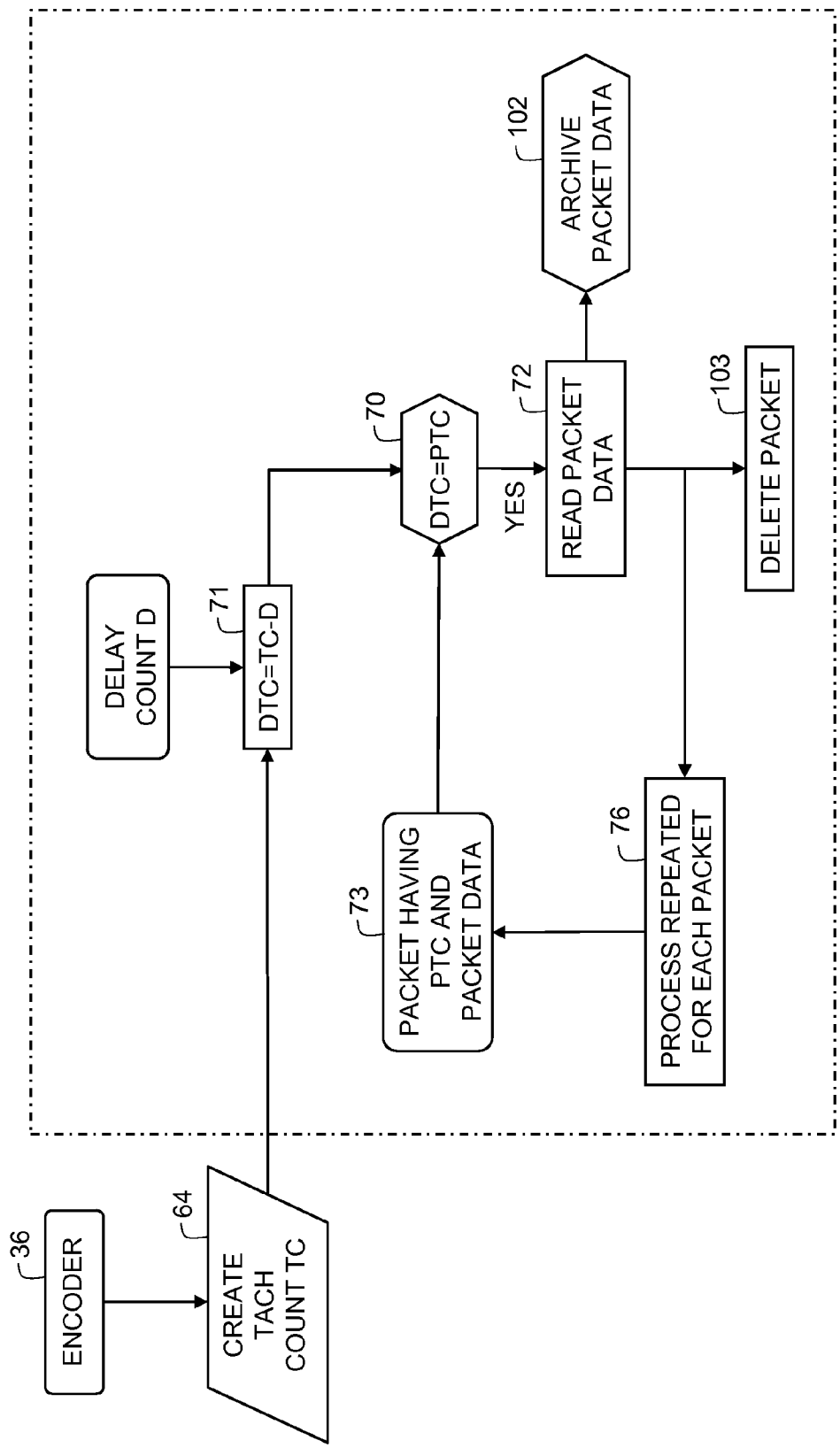
FIG. 6 is a functional diagram illustrating archiving of data from a metadata packet when the point of interest on the media linked with the metadata packet has arrived at a specific location along the media path.

A final unit in the printing system, having a delay count D that is greater than those of all other operating units, can read the data from each of the packets (including those packets created by a secondary packet creation unit) and can archive a portion or all of the packet data information into a validation file. An embodiment of this archiving process is illustrated in FIG. 6. The process of reading the packet data when the packet tach count PTC matches the current device read tach count DTC is the same as the packet read process shown in FIG. 3. Rather than use the packet information to modify an operating parameter as was done in block 74 of FIG. 3, the packet data is archived 102. The archive can include a computer data file or database. In some embodiments a single file contains all the data archived from all the metadata packets of a print job. In other embodiments, the data is separated into a number of files. For example, all the bar code verification may be saved into one file while the color to color registration data may be saved into a separate file. The archived data can be stored on a system hard drive or onto some other computer storage media such as a CD, DVD, flash drive or the like. After the metadata information has been archived, the metadata packet is deleted 103, freeing up the memory associated with the metadata packet for reuse. Depending on the nature of the data that is archived, the archived data can be used as a validation file to be sent to the originator of the print job to validate the completion of the print job. Other uses of the archived data include print job cost analysis and quality control analysis. In printing systems in which the data from the metadata packets is not archived, after each point of interest passes the final operating unit in the printing system, the associated metadata packets are deleted to free up the memory for reuse.

Figure 7:
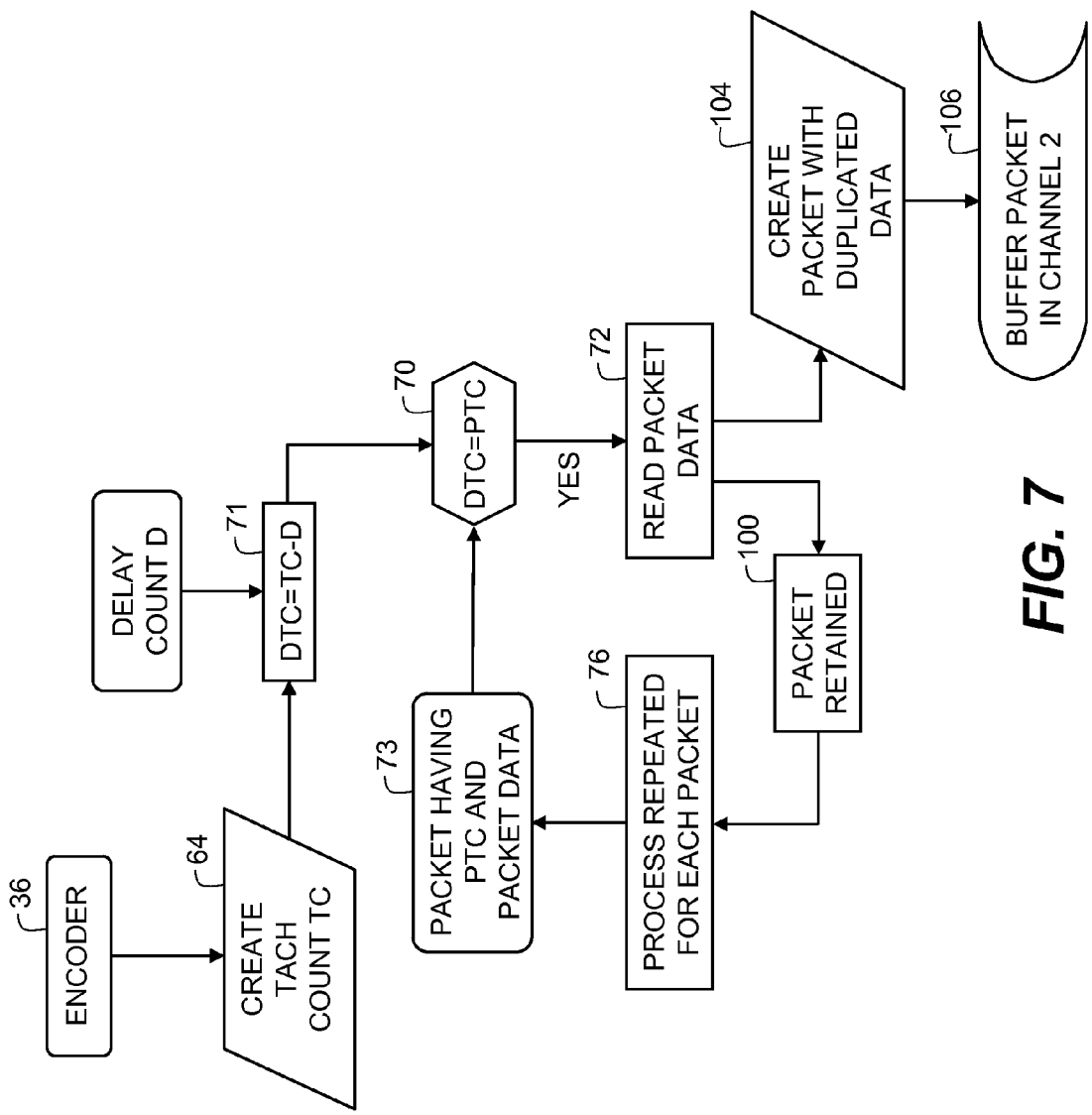
FIG. 7 is a functional diagram illustrating the creation of metadata packets in a secondary metadata channel.

In some printing system layouts, it is desirable to slit the media longitudinally part way through the printing system with the different media segments being subsequently acted on by different groups of operating units downstream of the slitting operation. One method for enabling the separate media strips to be tracked as they pass subsequent operating units involves the creation of a secondary metadata channel, as shown in FIG. 7. It reads a metadata packet in the initial metadata channel in the manner shown in FIG. 3. A new metadata packet is created 104 that is placed 106 in the second metadata channel. The new metadata packet includes data from the packet in the primary metadata channel. The metadata packet in the primary metadata channel is retained 100 in the primary metadata channel and can be accessed by downstream operating units in the primary media path. The metadata packets placed in the secondary metadata channel can be accessed by downstream operating units along the secondary media path. Both the primary and secondary metadata channels in this embodiment use the same tach count TC from the common encoder. A common origin position is used for both metadata channels as well.

Figure 8:
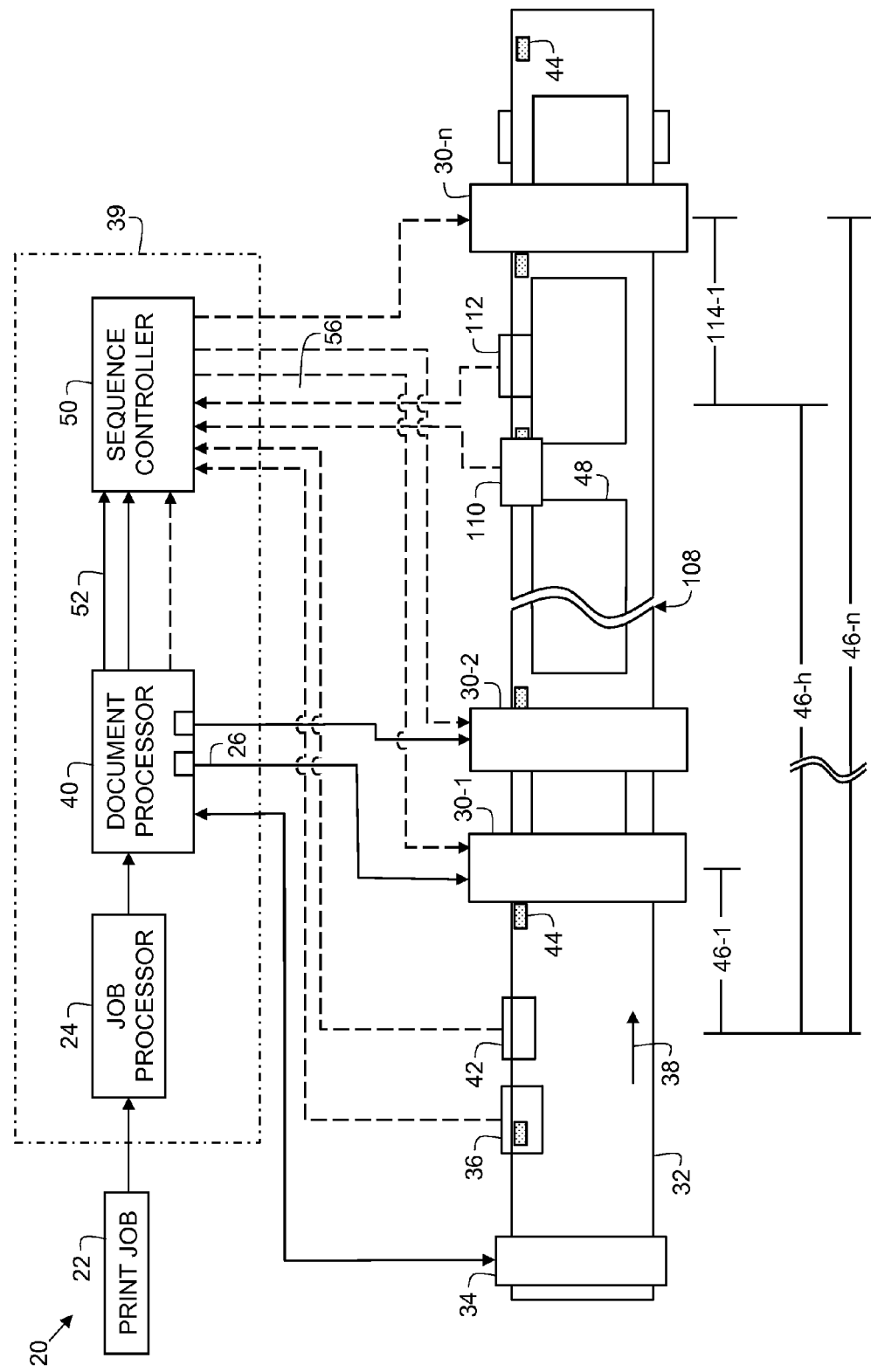
FIG. 8 illustrates an embodiment of digital printing system incorporating the present invention in which there are two sets of operating units.

FIG. 8 illustrates a printing system in which there is a large gap or distance 108 between one set of operating units (30-1, 30-2) and a second set of operating units (30-n). In some such cases the dimensional stability of the media in the large gap 108 between the first and second set of operating units or the presence of a festoon web accumulator can cause the delay distance 46-n to operating unit 30-n being poorly defined or effectively unstable. As a result, the action of the operating units in the second set is poorly registered to the action of the operating units in the first set, and possibly with other operating units in the same set of operating units.

This problem can be overcome by using a second metadata channel for relinking metadata packets to points of interest on the media as they pass the second group of operating units. As the media passes by the first group of operating units (30-1 and 30-2), the media motion is tracked by encoder 36. A cue sensor 42 can be used to detect cue marks 44 on the print media as was done in the system of FIG. 1. After the media passes the gap 108, it is necessary to relink metadata packets in a secondary metadata channel with points of interest on the media 32. After the gap 108, the media is tracked by a second encoder 110 as it passes by the second set of operating units (30-n). An incident detector 112 is used to detect incident marks on the media 32. The incident marks can include cue marks 44 that were detected by cue sensor 42 in the first portion of the printing system, or they can include marks (not shown) applied to the media by one of the operating units in the first portion of the printing system at the points of interest along the media associated with each of the metadata packets. The incident detector 112 location becomes the origin for this second portion of the printing system so that the delay distance 114-1 of the operating units are measured from the incident detector 112.

Figure 9:
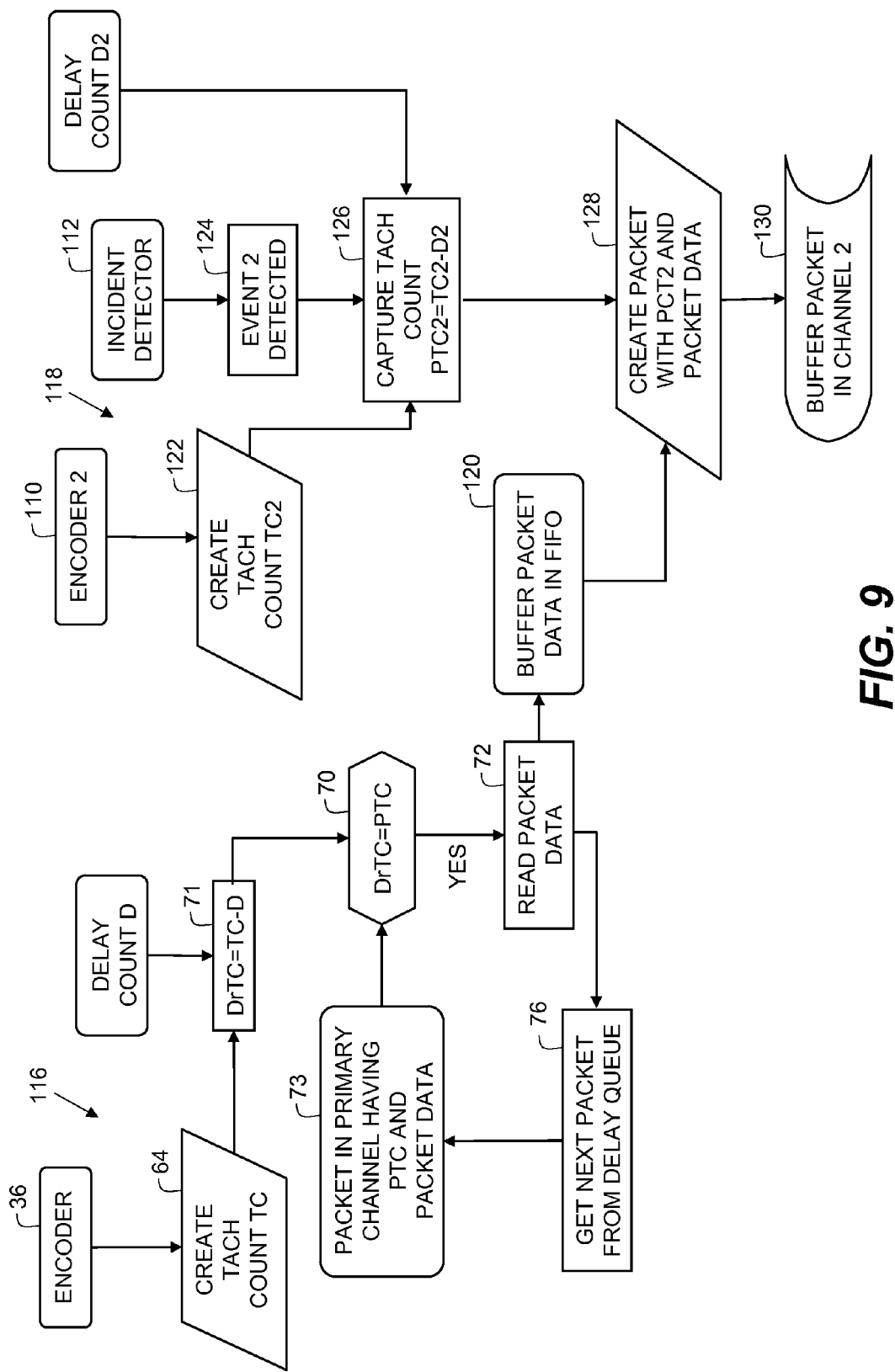
FIG. 9 is a functional diagram illustrating the transfer of metadata packets from a first metadata channel to a secondary metadata channel, and relinking the metadata packets to points of interest on the media.

FIG. 9 shows an embodiment of a method for transferring metadata from a primary metadata channel to another metadata channel that relinks the metadata packets to points of interest along the print media. It combines a packet reading segment 116 that is similar to that of FIG. 3 with a packet creating segment 118 that is similar to that of FIG. 2. Like the process shown in FIG. 3, metadata packets 73 in the primary channel are read 72 when the packet PTC value equals the device read tach count DrTC as determined by comparator 70. The device read tach count DrTC is created in block 71 by subtracting the delay count D from the tach count TC that is based on the primary encoder 36. The data read from successive packets are buffered as packets in a FIFO buffer 120. The packet data remains in the FIFO until it can be written into packets in the secondary metadata channel. The metadata packets are read in the order in which the points of interest along the media pass the location of this packet reader. The packets of data stored in the FIFO are therefore in the same order.

In the first portion of the printing system, the metadata packets were associated with points of interest along the print media. The points of interest may have corresponded to cue marks 44 that were detected by the cue sensor 42. It is necessary to link the metadata packets with those same points of interest in the second portion of the printing system. In the second portion of the printer, a second encoder 110 tracks the motion of the media. A second counter 122 counts the pulses from the second encoder 110 to generate a second tech count TC2. An incident detector 112, which may be a camera or other sensor is employed to detect incident marks such as cue marks. When a point of interest is detected by event detector 124, which receives the output of the incident detector 112, the current value of the second tach count TC2 is captured 126. A packet tach count PTC2 is created by subtracting the delay count D2 from the captured TC2 value. Typically the incident detector 112 is at the origin position for the second portion of the printing system and therefore D2 is zero, in such cases. The a new metadata packet is created 128 with the packet data taken from the FIFO buffer 120, and with the second packet count PTC2 replacing the primary packet count PTC as the index number for the packet. The new packet is placed in the secondary metadata channel 130, and may be access by all the downstream operating units.

To ensure that the packet reading element 116 reads the packets after all the operating units in the first set of operating units have interacted with the packets, the delay count D for the packet reading element 116 should be larger than the delay counts for all other operating units of the first set. When an incident mark is detected by the incident detector 112, the data for the packet created in packet creator 128 should be present in the FIFO buffer 120. This mandates that the packet data of a metadata packet associated with a point of interest along the media should be read by reading element 116 before the point of interest reaches the incident detector 112. Therefore the delay count for the packet reading element 116 should be less than the delay count that would correspond to the delay distance 46-h to the incident detector 112 from the origin of the first portion of the printer in FIG. 8. In this manner, the packet data is again linked to same points of interest along the media. As these points in interest pass downstream operating units (30-n), the operating units can interact with the metadata packets in the way described above.

By means of these basic ways in which operating units can interact with metadata packets in the metadata channel, the operation of the printing system is enhanced. The following are some exemplary ways in which the metadata channel can be used. The job processor and the page processor can supply data related to the start of print location and the document length for each document to printhead operating units by means of the metadata packets. As each printhead completes the printing of a document, the printhead can write to the packet associated with the document to indicate that it completed its printing of the document. The metadata packets can also be used to send setup parameters to finishing equipment such as slitters, cutters and folders to define the locations or spacing of slits, cuts, and folds. As the metadata packets are linked to a specific location on the media, for example, using encoder counts, the initiation and termination of the action of such finishing equipment can be defined with greater accuracy than prior art systems.

The metadata packets can also include data for selective coating units to define particular regions in a document to be coated. Drying and curing units can be supplied data via the metadata packets enabling them to adjust the power levels based on the ink coverage level of each document. For this function, the data in the metadata packet can include a power level setting to be used for drying or curing the document. Alternatively the metadata packet associated with a document can include a measure of the ink coverage level for the document, which is employed by a controller for the drying or curing unit to determine the proper power level for drying or curing a document.

Certain printing units can accept and interpret short character strings for printing, such as certain MICR printers. Short character strings for printing can be sent to such printing units by means of the metadata channel. While short character strings can be sent to a printing unit by means of the metadata channel, the metadata channel is distinct from the regular print data stream which transmits large quantities of data to printhead units along the media path.

The metadata channel is also useful for communicating with inspection and document verifying operating units. Inspection equipment can include optical densitometers for measuring the optical density of print on the media, spectrophotometers for measuring the color of print, sensors for ensuring proper image plane registration (such as color to color registration, printhead stitching sensors, and front to back registration), and print quality sensors such as detectors for missing jets or streakers. The metadata can instruct the inspection units where to make the measurements within a defined region of the recording media, for example, a region that is located across the width of the web and in the paper feed direction. The direct link between the metadata packet and a location in the paper feed direction enables the inspection units to more accurately locate the inspection area of interest than prior art systems. These inspection units can also write back to the metadata packet the results of the inspection. These inspection results could then be saved to an archive file using an archiving operating unit such as is illustrated in FIG. 6. The archive file can then be provided, if needed, to a buyer of a print job to validate that the print job was properly printed.

In a similar manner, the metadata channel is useful for communicating with document verification equipment. Verifying equipment can include, but is not limited to, equipment that confirms that the data printed on a document matches the intended data, tests for the proper correlation of image planes printed by the various printheads, and readability sensors of, for example, printed UCR text, bar codes, or MICR print. The metadata can include information instructing the verifying equipment where to make the measurements. Furthermore, the metadata can include data to be compared by the verifying equipment with the measured value. For example, a bar code verifier could be provided with the bar code value against which the measured bar code can be compared. As with the inspection equipment, the verification equipment can write the results of the verification test to the metadata packet. The invention simplifies the verification process by providing a common mechanism to communicate the reference data for the verification test, the precise location on the media to be checked, and the results of the verification test.

It is also possible for other operating units to create metadata packets and insert them into the metadata channel populated with packets from the primary creation unit. For example an automatic web splicer or a splice detecting operating unit can create a metadata packet and insert it into the metadata channel. The created packet would identify the location of a paper splice. The splicer would typically be located upstream of the primary packet creating operating unit, which is typically located at the origin of the media path. As mentioned earlier, positions upstream of the origin have negative delay distances and delay counts. When a metadata packet associated with splice is read by the primary packet creation unit, the primary packet creation unit could use the packet data to block out a region around the splice so that no document is printed in the blocked out region.

Generally described, according to another aspect of the present invention a method of controlling a digital printing system that uses multiple metadata packets is provided. A controller including a metadata channel is provided. Information in a first metadata packet that is associated with an initial point of interest of a media is provided by a primary metadata packet creation unit. The first metadata packet is inserted into the metadata channel of the controller. A second metadata packet including new information associated with a new point of interest of the media is created using a secondary metadata creation unit. The second metadata packet with the new formation is inserted into the metadata channel of the controller based on the location of the new point of interest of the media.

The second metadata packet including new information can be created as follows. A location of the initial point of interest of the media can be monitored as the media moves through the digital printing system. An operating parameter of the digital printing system can also be monitored. A location of the new point of interest of the media can be identified as the media moves through the digital printing system.

The location of the initial point of interest of the media can be monitored by determining when the initial point of interest arrives at a location along a media path. Alternatively, the location of the initial point of interest of the media can be monitored by detecting at a location along the media path a mark on the recording media indicating the location of the initial point of interest. An example embodiment of this aspect of the present invention is described below.

Figure 10:
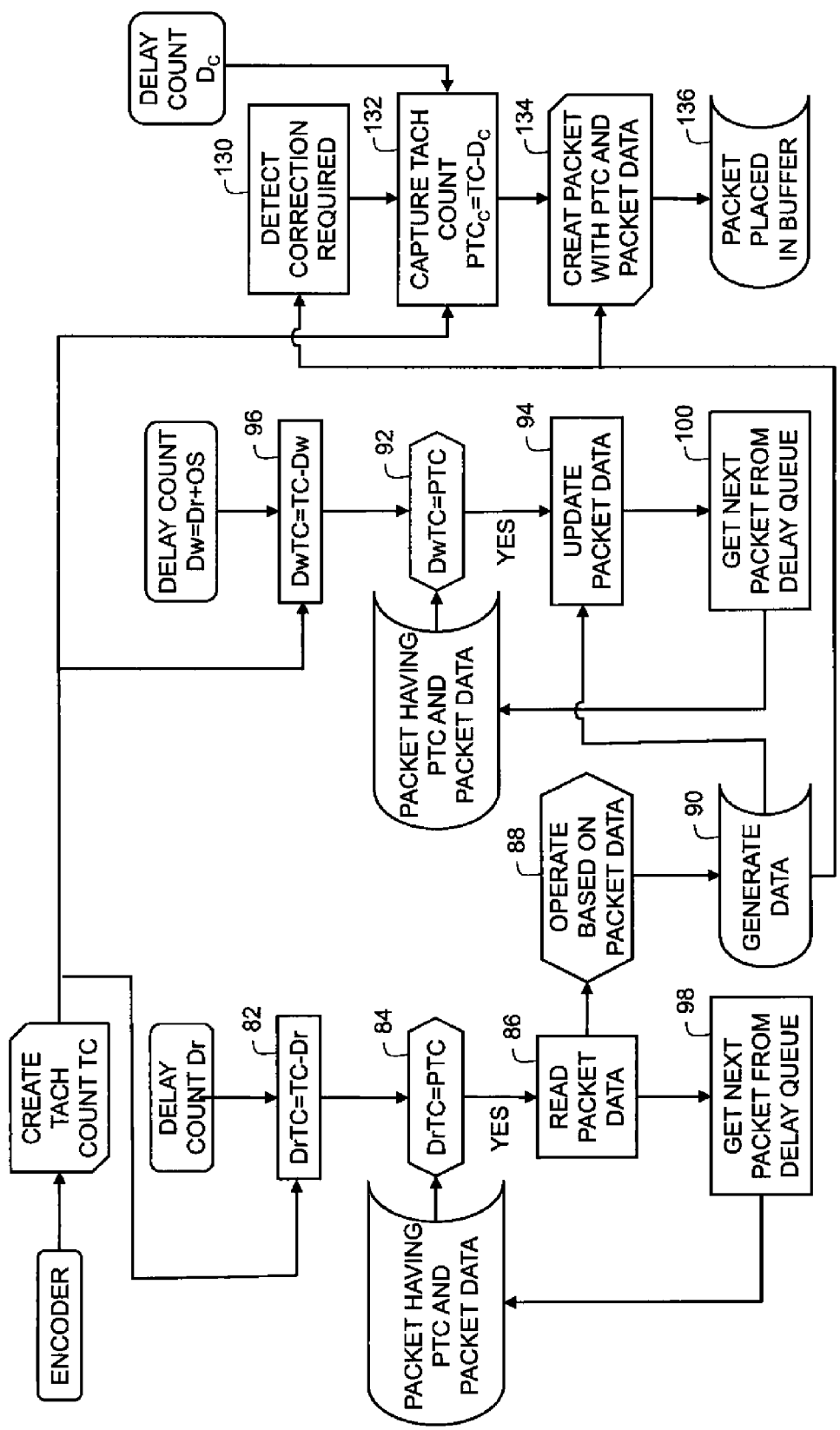
FIG. 10 is a functional diagram illustrating the writing of data into two metadata packets in the metadata channel.

FIG. 10 illustrates another example interaction with the metadata, where an operating unit creates and inserts metadata packets into the metadata channel that has been populated with packets from the primary packet creation unit. In this sense, these operating units can be referred to as secondary packet creation units. This illustration relates to an inspection operating unit that is part of a control loop for some printing function. For example the inspection unit could be an operating unit for inspecting color to color registration or for inspecting the stitching between jetting modules. The operating unit reads information from a metadata packet, and then carries out an inspection operation, generating some response data in block 90. Like the interaction shown in FIG. 5, the result data back can be written into the metadata packet so that can be accessed and possibly archived by downstream operating units, in blocks 96-100. As these steps for these operations are the same as those in FIG. 5, they won't be discussed further. If the correction detector 130 determines through analysis of the generated data the need for corrective action, the current tach count TC is captured and a packet tach count for corrective action $PTC_c$ is created in block 132. $PTC_c$ is equal to the captured tach count TC minus the delay count $D_c$. To enable the results of the inspection unit to be used to modify the upstream operating units, such as modifying the registration of the image planes printed by upstream printheads, the delay count $D_c$ does not correspond to the delay distance for the inspection unit. Instead the delay count $D_c$ corresponds to a location along the media path upstream of the operating unit that should take the corrective action. Referring back to FIG. 1, consider operating units 30-1 and 30-2 to be printheads and operating unit 30-n to be an inspection unit checking the registration of the print from both printheads. To enable the print from unit 30-2 to be shifted relative to the print from 30-1, the delay count $D_c$ should be less than the delay count for operating unit 30-2. A packet is created in block 134 containing the packet tach count for corrective action $PTC_c$ and data needed for carrying of the corrective action. The corrective action metadata packets are inserted into the metadata channel containing the other metadata packets in 136.

In this manner, a new metadata packet associated with a second point of interest of the media is created. The second point of interest is distinct from initial or first point of interest of the metadata packet that was read. The location of the second point of interest can be upstream of the location of the first point of interest. The new metadata packet includes new information which is based on the monitored operating parameter of the digital printing system. In some example embodiments, the new metadata packet can include data from the initially provided metadata packet. Alternatively, new metadata packets can be created without writing to the initial metadata packet.

Referring back to FIG. 10, the second metadata packet can be created by reading data from the first metadata packet associated with the initial point of interest of the media, then modifying an operation of the digital printing system using the read data, and then capturing data of a monitored operating parameter of the digital printing system that results from modifying the operation of the digital printing system. The captured data can be written to the first metadata packet.

The operating parameter of the digital printing system being monitored can be related to one of the recording media and print on the recording media. The modification of the operation of the digital printing system data can include defining a region of the recording media to be acted on by an operating unit of the digital printing system. The captured data that results from modifying the operation of the digital printing system can include a measured parameter related to the recording media within the defined region.

As described above with reference to the initially provided metadata packet, at least one of the first metadata packet and the second metadata packet can be assigned an index number related to the location of the point of interest in order to associate the metadata packet with its corresponding point of interest. At least one of the initial point of interest of the media and the new point of interest of the media can be associated with a print document. The new information of the second metadata packet can include data verifying an action of an operating unit on the recording media.

Figure 11:
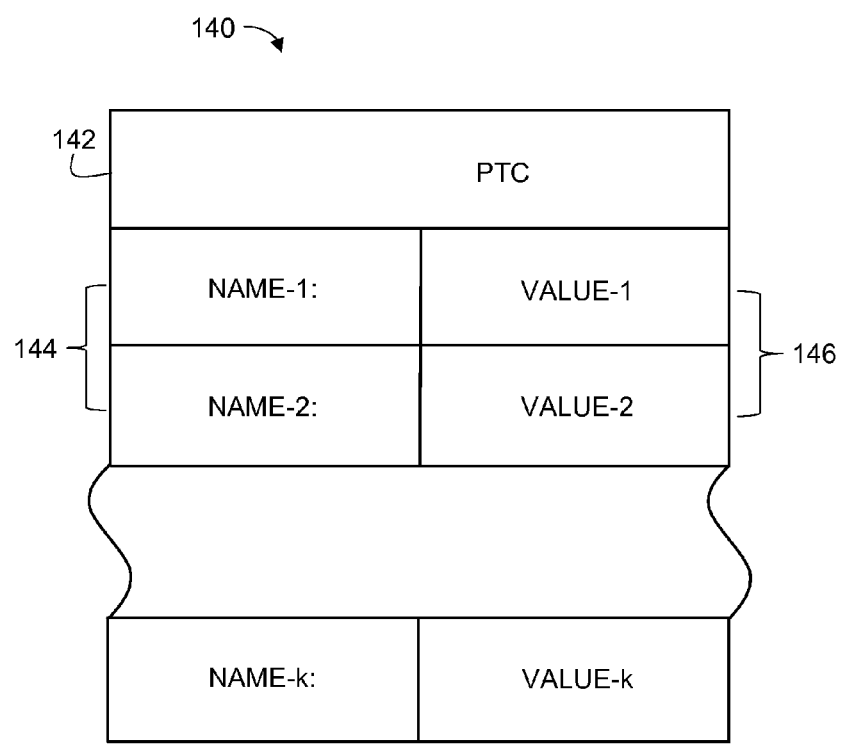
FIG. 11 illustrates an embodiment of the data structure in a metadata packet.

An embodiment format for a metadata packet 140 is illustrated in FIG. 11. In this embodiment the primary packet index 142 for the packet is the PTC value that links the packet to a point on media. Following the primary index is the packet data for transferring to and from the operation units. This data has the parameter name 144 followed by the parameter value 146. The different parameters are separated by line feeds, and the parameter value is separated from the parameter name by a colon in this embodiment, but other delimiters can be used in place of both these delimiters. In an alternate packet structure embodiment, the order of the parameters from 1-k is defined. In this alternative structure, it is not necessary to include the parameter names in the metadata packets as each parameter's value is linked to the proper parameter by its place in the order. This reduces the size of the metadata packets, but makes it harder to incorporate new parameters into the metadata structure. The amount of data (the number of parameters and the character limits for the parameter values) included in the metadata packet is only limited by the amount of memory allocated to the metadata channel. If memory in the metadata channel is limited, it is possible for a parameter in the metadata packet to be a pointer a block in memory that contains additional parameters and data to be read. In certain embodiments, all metadata packets have the same size; they have the same amount of allocated memory, whether it is all used or not in a particular packet. In other embodiments the metadata packet size can vary dynamically to match the size requirements of the included data.

Figure 12:
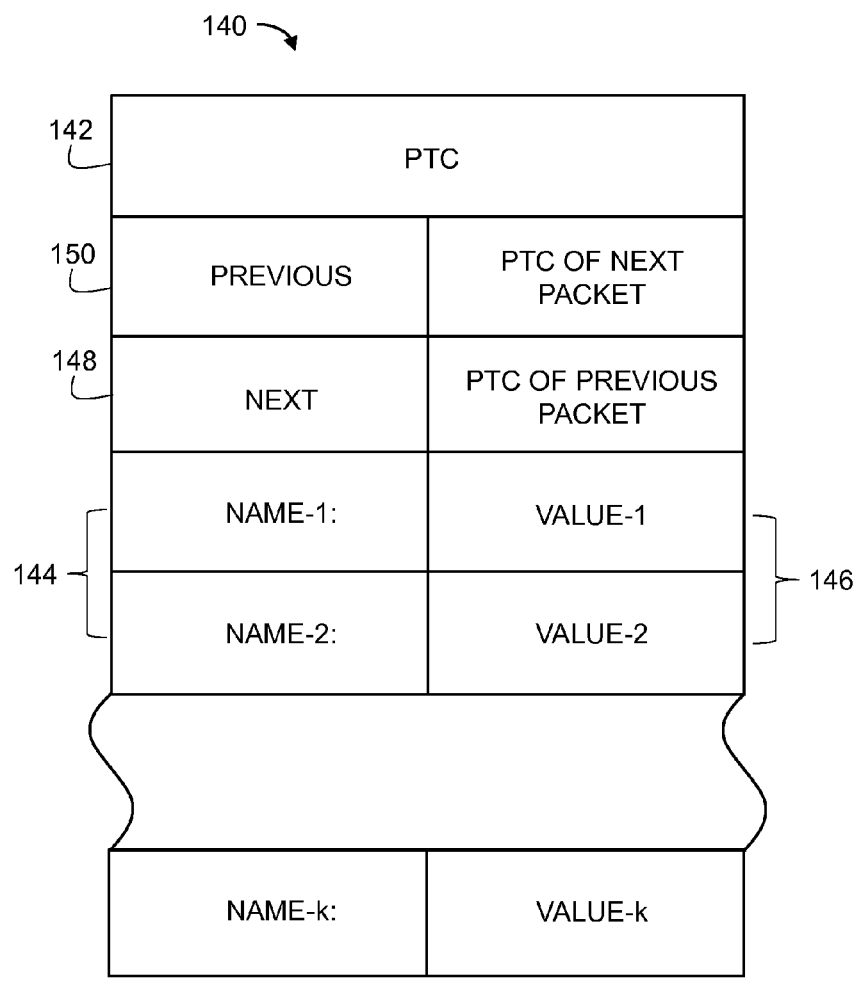
FIG. 12 illustrates another embodiment of the data structure in a metadata packet.

An embodiment format for a metadata packet 140 is illustrated in FIG. 12. In this embodiment, each metadata packet includes pointers 148 and 150 to the next and previous packets respectively. These pointers help maintain the order of the packets. After a packet is read by an operating unit at a specific location along the media path, the NEXT pointer identifies the next point of interest along the recording media, and the associated metadata packet, to arrive at the operating unit as the recording media continues to move through the paper path from upstream to downstream. The identification of the next packet is denoted in FIG. 3 as an optional step between reading the data 72 and repeating the process 76 by block 152. This step of identifying the next packet by means of a NEXT pointer in the metadata packet can be included in of the various interactions between the operating units and the metadata packets. For simplicity this step has not been included in the other illustrated interactions. When a secondary packet creating unit inserts a packet into a metadata channel with a point of interest between the points of interest for two existing metadata packets it also updates the appropriate points in those two metadata packets so that they properly point to the new metadata packet.

In one example embodiment of the digital printing system, the system for creating metadata packet and accessing the metadata packets as their associated points of interest on the recording media move along the media path is carried out using a field programmable gate array (FPGA). Additional memory coupled to the FPGA provides the memory needed to hold all the metadata packets in the metadata channel.

The invention has been described in detail with particular reference to certain preferred embodiments thereof, but it will be understood that variations and modifications can be effected within the scope of the invention.

PARTS LIST

20 Printing System
22 Print Job
24 Job Processor
26 Image Data
28 Raster Image Processor
30 Operating Unit 32 Recording Media
34 Media Transport System
36 Encoder
38 Arrow
39 Machine Controller
40 Document Processor
42 Cue Sensor
44 Cue Mark
46 Delay Distance
48 Document Image
50 Sequence Controller
52 Information
54 Offset Distance
56 Start Of Document
58 Job Processor
60 Printing Controller
62 Units
64 Counter
66 Event Detector
67 Data
68 Tach Count Captured
69 Packet Created
70 Comparator
71 Count Shifter
72 Packet Reader
73 Metadata Packet
74 Block
76 Process Repeated
78 Monitor
80 Data Capture
82 Count Shifter
84 Comparator
86 Packet Read
88 Operation Carried Out
90 Data Created
92 Comparator
94 Packet Updated
96 Count Shifter
98 Process Repeated
100 Packet Retained
102 Data Archived
103 Packet Deleted
104 Packet Created
108 Gap
110 Second Encoder
112 Incident Detector
114 Delay Distance
116 Packet Reading Segment
118 Packet Writing Segment
120 FIFO Buffer
122 Second Counter
124 Event Detector
126 Tach Count Captured
128 Packet Created
130 Correction Detector
132 Tach Count Captured
134 Packet Created
136 Packet Placed
140 Packet
142 Packet Index
144 Parameter Name
146 Parameter Value
148 Next Pointer
150 Previous Pointer
152 Identify Next Packet

The invention claimed is:

1. A method of controlling a digital printing system comprising:
 providing a media that passes through the digital printing system along a media path;
 providing a plurality of operating units positioned along the media path for performing functions on the media;
 providing a controller including a metadata channel;
 using a primary metadata packet creation unit to provide information in a first metadata packet, the first metadata packet being associated with a first point of interest on the media, the first point of interest moving with the media along the media path;
 inserting the first metadata packet with the information into the metadata channel of the controller;
 using the controller to control an operation of at least one of the operating units responsive to the information in the first metadata packet when the first point of interest passes the operating unit;
 using a secondary metadata packet creation unit distinct from the primary metadata creation unit to provide new information in a second metadata packet, the second metadata packet being associated with a second point of interest on the media, the second point of interest being distinct from the first point of interest and moving with the media along the media path, wherein the new information in the second metadata packet is provided based on a monitored operating parameter of the digital printing system while operating on the first point of interest on the media; and
 inserting the second metadata packet with the new information into the metadata channel of the controller based on the location of the new point of interest on the media; and
 using the controller to control an operation of at least one of the operating units responsive to the information in the second metadata packet when the second point of interest passes the operating unit.

2. The method of claim 1, wherein creating the second metadata packet including new information associated with the second point of interest on the media using the secondary metadata creation unit comprises:
 monitoring a location of the first point of interest on the media as the media moves through the digital printing system;
 monitoring an operating parameter of the digital printing system; and
 identifying a location of the second point of interest on the media as the media moves through the digital printing system.

3. The method of claim 2, wherein monitoring the location of the first point of interest of the media as the media moves through the digital printing system includes determining when the initial point of interest arrives at a location along a media path.

4. The method of claim 2, wherein monitoring the location of the first point of interest on the media as the media moves through the digital printing system along the media path includes detecting at a location along the media path a mark on the recording media indicating the location of the first point of interest.

5. The method of claim 1, further comprising:
 modifying the information in the first metadata packet using the secondary metadata creation unit.

6. The method of claim 1, wherein the monitored operating parameter of the digital printing system is a parameter related to the media or content printed on the media.

7. The method of claim 1, wherein the control of the operation of one of the operating units includes defining a region of the media to be acted on by the operating unit.

8. The method of claim 7, wherein the monitored operating parameter of the digital printing system includes a parameter related to the media within the defined region.

9. The method of claim 1, further comprising:
   archiving at least a portion of one of the information in the first metadata packet and the information in the second metadata packet.

10. The method of claim 1, wherein at least one of associating the first metadata packet with the first point of interest on the media and associating the second metadata packet with the second point of interest on the media includes assigning to the metadata packet an index number related to the location of the corresponding point of interest.

11. The method of claim 1, wherein at least one of the first point of interest on the media and the second point of interest on the media is associated with a print document.

12. The method of claim 1, wherein the new information of the second metadata packet includes data verifying an action of an operating unit operating on the first point of interest on the media.

\* \* \* \* \*